United States Patent
Baker

(10) Patent No.: US 6,662,832 B2
(45) Date of Patent: Dec. 16, 2003

(54) FILLING APPARATUS

(75) Inventor: William George Baker, Brookvale (AU)

(73) Assignee: Design Engineering Pty Limited, Brookvale (AU)

( * ) Notice: Subject to any disclaimer, the term of this patent is extended or adjusted under 35 U.S.C. 154(b) by 0 days.

(21) Appl. No.: 10/095,598

(22) Filed: Mar. 7, 2002

(65) Prior Publication Data

US 2002/0157729 A1 Oct. 31, 2002

Related U.S. Application Data

(63) Continuation-in-part of application No. 09/673,062, filed as application No. PCT/AU99/00266 on Apr. 9, 1999, now abandoned.

(30) Foreign Application Priority Data

Apr. 9, 1998 (AU) .............................................. PP2937

(51) Int. Cl.[7] ................................................ B65B 1/04
(52) U.S. Cl. ....................... 141/234; 141/10; 141/114; 141/313; 141/83
(58) Field of Search ................... 141/10, 114, 313–317, 141/284, 285, 286, 234, 248, 177, 83

(56) References Cited

U.S. PATENT DOCUMENTS 1,244,900 A * 10/1917 Runions ..................... 141/248
4,266,691 A * 5/1981 Wolwowicz ................. 222/77
4,576,209 A * 3/1986 Eisenberg ...................... 141/1
4,615,363 A * 10/1986 Baker ......................... 141/193
5,022,444 A * 6/1991 Kendall et al. ............. 141/248
5,215,127 A * 6/1993 Bergeron ..................... 141/10

* cited by examiner

Primary Examiner—Steven O. Douglas
(74) Attorney, Agent, or Firm—Townsend and Townsend and Crew LLP

(57) ABSTRACT

Apparatus and methods for filling one or more containers with flowable material such as cereals, grain or rice. Flowable material is transferred via a material guide into filling stations. The material guide or the filling stations can be moved between a first position in which all the flowable material input is guided into the first container, and a second position in which all the flowable material input is guided into the second container. At intermediate positions between the first and second positions, the flowable material input is divided between the first and second containers. The proportion of flowable material entering each of the containers is varied to enable a nearly full container to be topped up to the desired level while maintaining control over the flow and at the same time rapidly filling another container. The filling stations, at which the containers are located, may be positioned in various configurations.

22 Claims, 12 Drawing Sheets

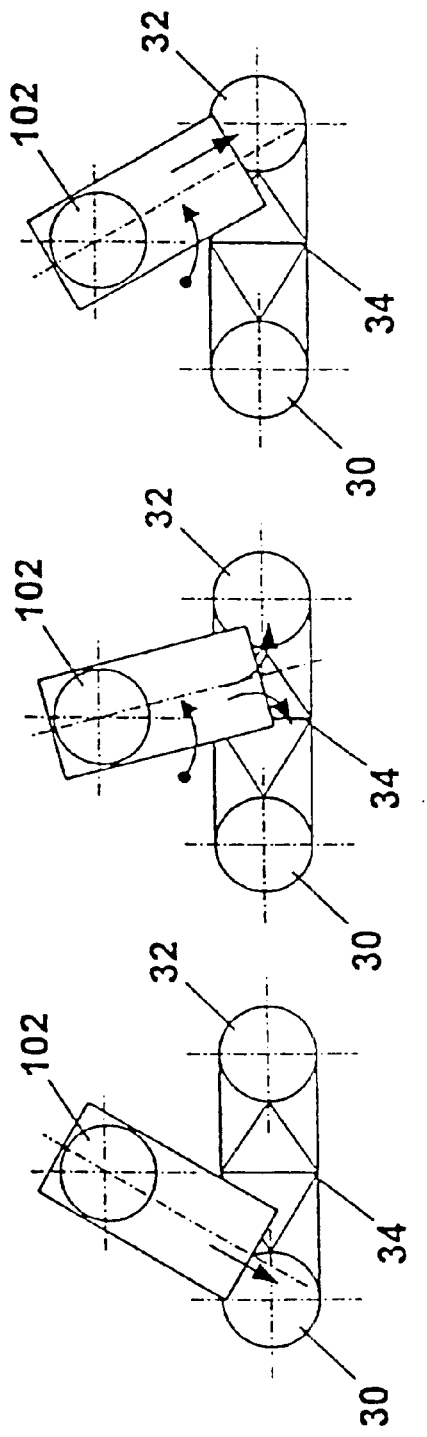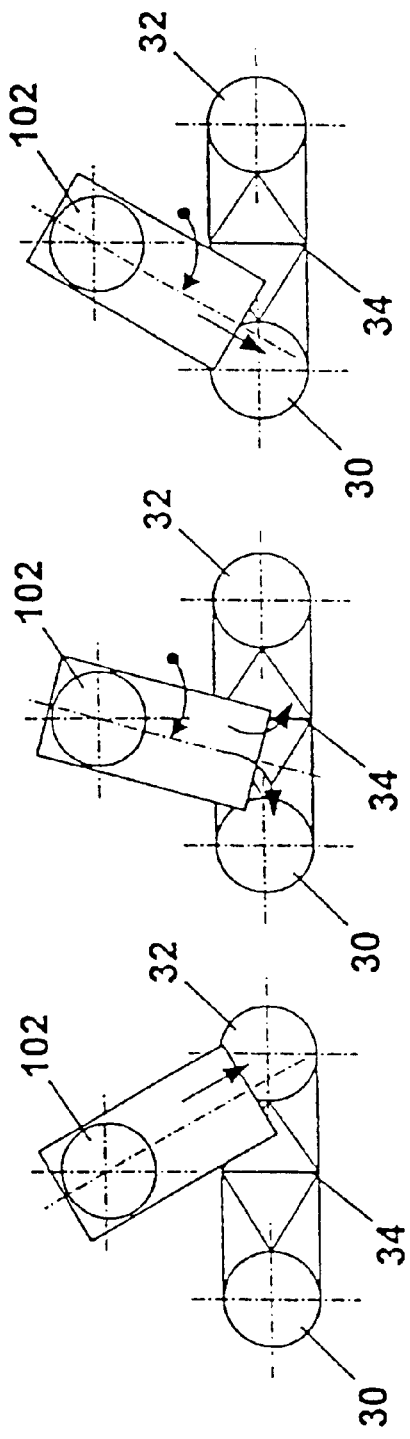

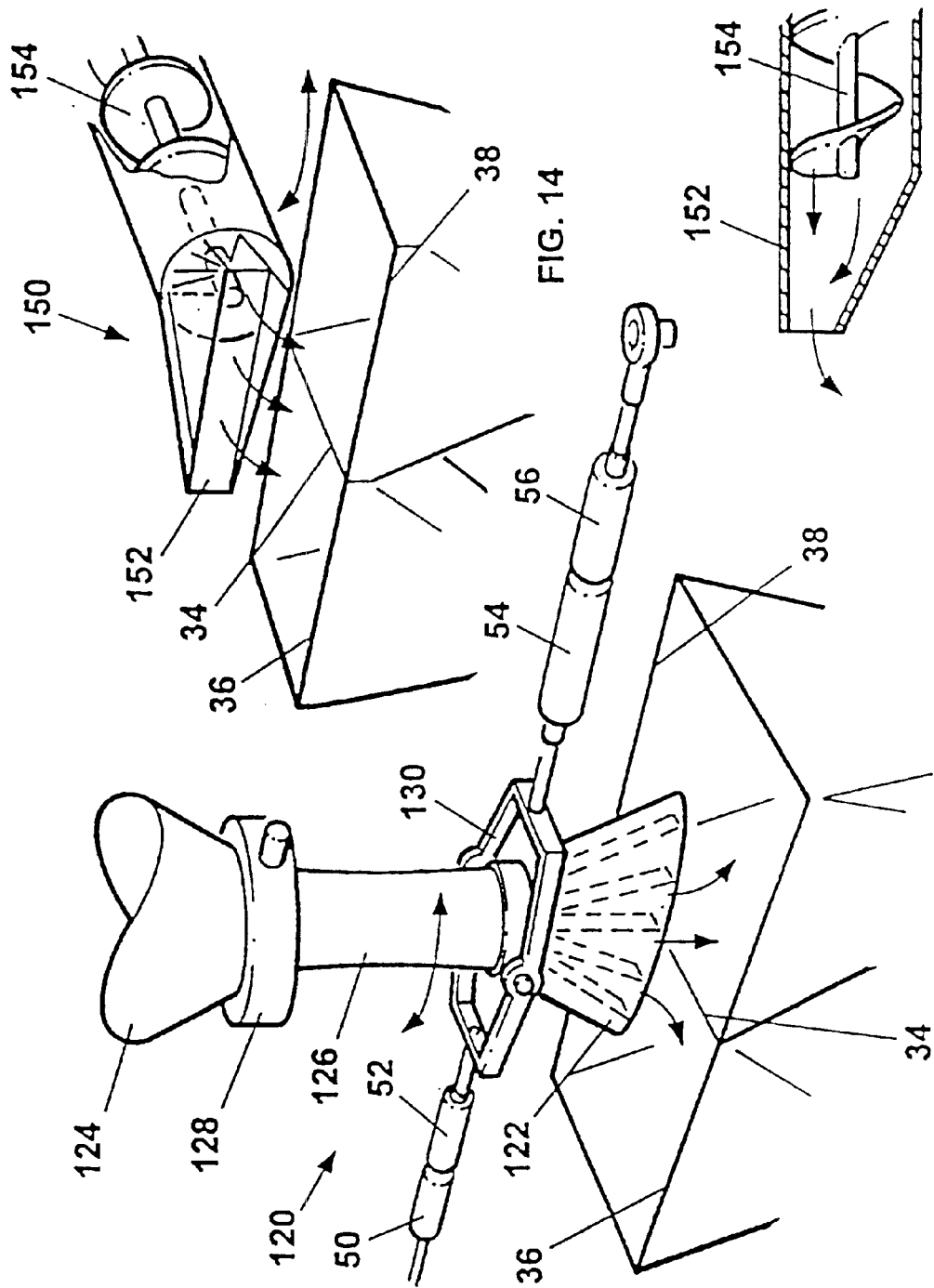

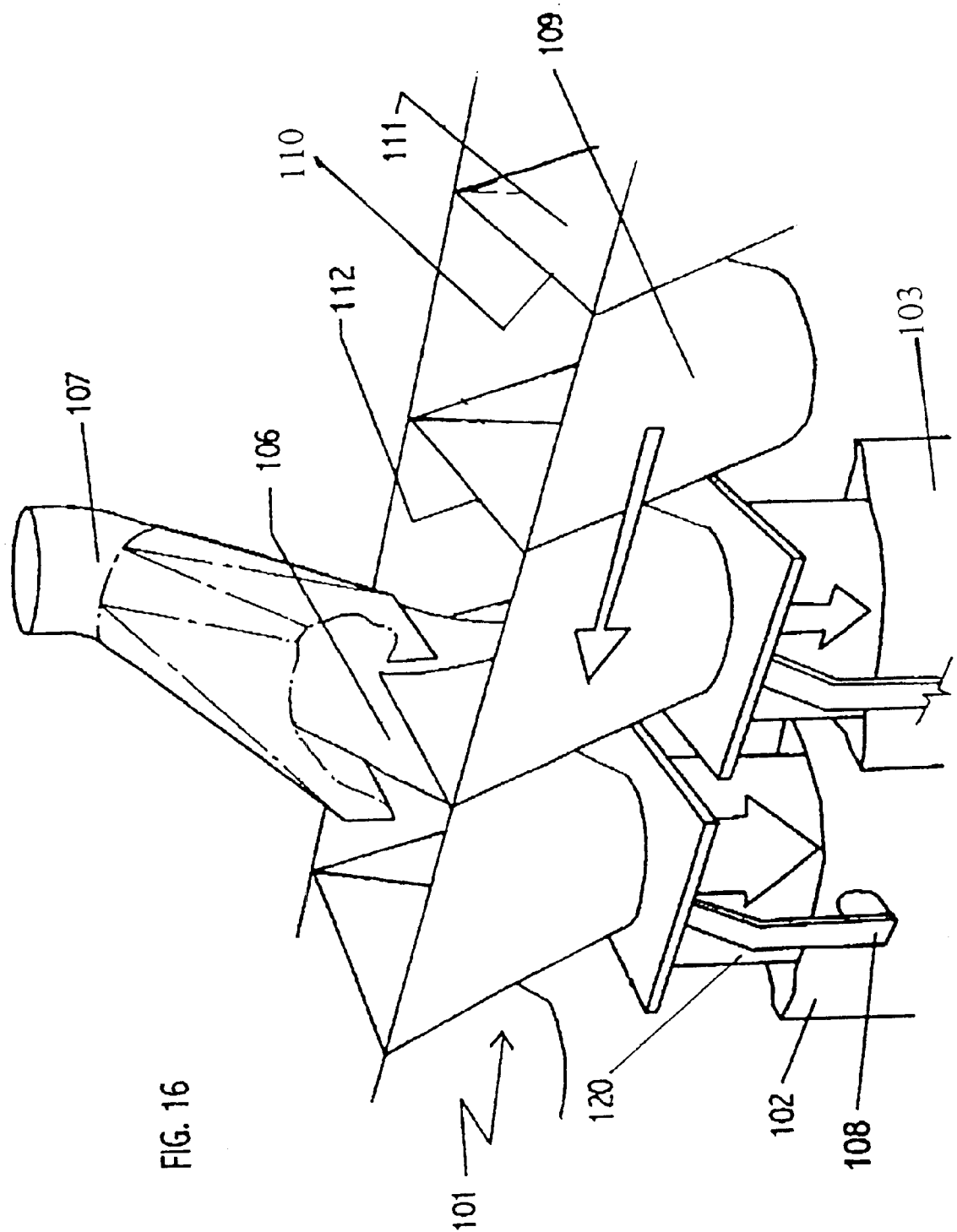

FILLING APPARATUS

CROSS-REFERENCE TO RELATED APPLICATIONS

This application is a continuation-in-part of U.S. application Ser. No. 09/673,062, filed Dec. 22, 2000, now abandoned which itself is a §371 application of International Application No. PCT/AU99/00266, filed on Apr. 9, 1999, which itself claimed the benefit of Australian Application No. PP2937, filed on Apr. 9, 1998.

FIELD OF THE INVENTION

The present invention relates to a filling apparatus and more particularly to a filling apparatus capable of continuous, sequential filling of a plurality of containers.

BACKGROUND ART

An apparatus of this type is used for filling containers, such as bags, with a predetermined weight of flowable material such as, for example, cereals, grain or rice.

An example of the Applicant's prior apparatus of this type is shown in Australian Patent No. 551762. This apparatus includes a chute which toggles under the influence of counterweights between directing all the flowable material input stream to a first container or to a second container.

A disadvantage of this prior art apparatus is that the speed of the flowable material must be limited so that the weighing apparatus can terminate the flow of material entering a container upon reaching its predetermined weight, with reasonable accuracy, notwithstanding inflight material and flow rate variations.

It is an object of the present invention to substantially overcome or at least ameliorate the disadvantages of the prior art devices and more particularly to provide a faster and more efficient filling arrangement.

It is a further object of the present invention to provide a filling arrangement capable of continuous, sequential filling of a plurality of containers.

SUMMARY OF THE INVENTION

Accordingly, in a first aspect, the present invention provides an apparatus for filling a plurality of containers with flowable material, the apparatus including:

a plurality of container filling stations arranged in a sequence; and a fixed flow divider located between one filling station and the next filling station in the sequence; and a material guide for flow of flowable material, wherein the apparatus includes means to move the material guide relative to the filling stations or vice versa so that the apparatus is capable of adopting:

a first rest position in which all the flow of flowable material is guided to one of the container filling stations;

an intermediate rest position in which the flow of flowable material is divided between the one container filling station and the next container filling station in the sequence; and a second rest position in which the flow of flowable material is guided to the next container filling station.

The flowable material is preferably grain, cereal or rice.

There may be two or more container filling stations. When there are more than two filling stations, preferably these are arranged in a loop, such as a circle, so that containers may be filled in a continuous manner, one after the other. In this embodiment, movement of the material guide relative to the filling stations, or vice versa, can be effected in one direction only, with an empty container being placed at an appropriate filling station ahead of flow from the material guide reaching that filling station, and with filled containers being removed sequentially after filling. In this embodiment, it is preferred that the material guide is stationary and the filling stations travel past the material guide, by means of a conveyer belt, for example.

Alternately, the sequence of container filling stations may have a start and a finish point, rather than forming a loop. This, of course, will be the case if there are only two filling stations. Even with three or more filling stations, it is within the scope of this invention that, once the containers at the filling stations have been filled, the apparatus is designed to move back to the start point and repeat the performance. In this embodiment, while either the material guide or the filling stations may move, it is preferred that the filling stations remain stationary and the material guide moves.

Desirably, at the intermediate rest position 10% of the flow of flowable material is directed substantially to the one container filling station and 90% of the flow of flowable material is directed substantially to the next container filling station.

In one preferred embodiment, the material guide is a chute adapted to pivot about a substantially vertical axis between the first and second positions. The chute preferably includes an inclined base and two substantially vertical side walls. The base is preferably upwardly convex and includes corrugations for spreading the material flow across the width of the base.

In other embodiments, the material guide is a vibrating tray, or an auger fed nozzle which pivots in a substantially horizontal plane, or a gravity fed nozzle mounted beneath a flexible tube for pivoting in a substantially vertical plane.

The material guide may be, in fact, more than one guide, which can be useful when the flowable material has a tendency to stick together or to stick to the guide. If there is more than one material guide they may be controlled (see below) independently. For example, where there are two material guides, the first may direct a larger proportion of the flowable material while the second directs the remainder.

It is to be understood that the means moving the material guide relative to the filling stations, or moving the filling stations relative to the material guide, may be any suitable means, one of which is described in connection with an embodiment in the drawings, below.

The apparatus preferably includes weighing devices to weigh the amount of material in each of the containers. When it is the material guide which moves, the apparatus preferably also includes a control system adapted to cause moving of the material guide between the first, intermediate and second rest positions. In a sophisticated version of the invention, the control system causes such movement in response to the weight of material in each of the containers.

The control system (which may also be used when the filing stations move) may be pneumatically driven. It also preferably includes fine adjustment means capable of adjusting the portion of flow of flowable material into the first or next container to a fine degree. For example, in one embodiment, the fine adjustment may cause the input to be divided so that 99% flows into one container while 1% flows into the other. The fine adjustment means preferably takes the form of a wheel adapted to cause the chute to move in small increments towards the first or second container.

In a second aspect, the present invention provides a method for filling a plurality of containers using the apparatus of the invention, said method including the steps of:

(1) directing all of the flow of flowable material into a first container until it is filled to a first predetermined weight;

(2) directing a portion of the flow of flowable material into each of the first container and a second container adjacent the first container until the first container is substantially full;

(3) directing all of the flow of flowable material into the second container until it is filled to a second predetermined weight;

(4) directing a portion of the flow of flowable material into each of the second container and a third container adjacent the second container; and (5) directing a portion of the flow of flowable material into each of the third and second containers until the second container is substantially full.

Preferably, steps (1) to (5) are repeated to continuously fill the plurality of containers until a predetermined number of containers is filled or the flow of flowable material is exhausted. The first and second predetermined weights are preferably substantially equal. Desirably, the flow at step (2) is directed 10% to the first container and 90% to the second container. At step (5) the flow is desirably directed 90%, 10% to the third and second containers respectively.

BRIEF DESCRIPTION OF THE DRAWINGS

Preferred embodiments of the invention will now be described, by way of example only, with reference to the accompanying drawings in which:

FIGS. 12a to 12f are plan views of the apparatus of FIG. 11 with the material guide in various filling positions;

FIG. 13 is a perspective view of a filling apparatus according to a third embodiment of the invention;

FIG. 14 is a perspective view of a filling apparatus according to a fourth embodiment of the invention;

FIG. 15 is a cross-sectional side view of the auger of the embodiment of FIG. 14;

FIG. 16 is a front view of a fifth embodiment of the invention with a fixed material guide in the intermediate position, the filling stations being in a straight line;

DETAILED DESCRIPTION OF THE PREFERRED EMBODIMENTS

Referring to FIGS. 1 to 6, there is shown a first embodiment of an apparatus 10 for filling a first container 12 and a second container 14 (each located at a filling station) with flowable material leaving the outlet 15 of, for example, an overhead hopper gravity feeding through a pneumatic gate valve, an auger driven by a variable speed electric motor or a vibratory feeder.

Figures 7, 8:
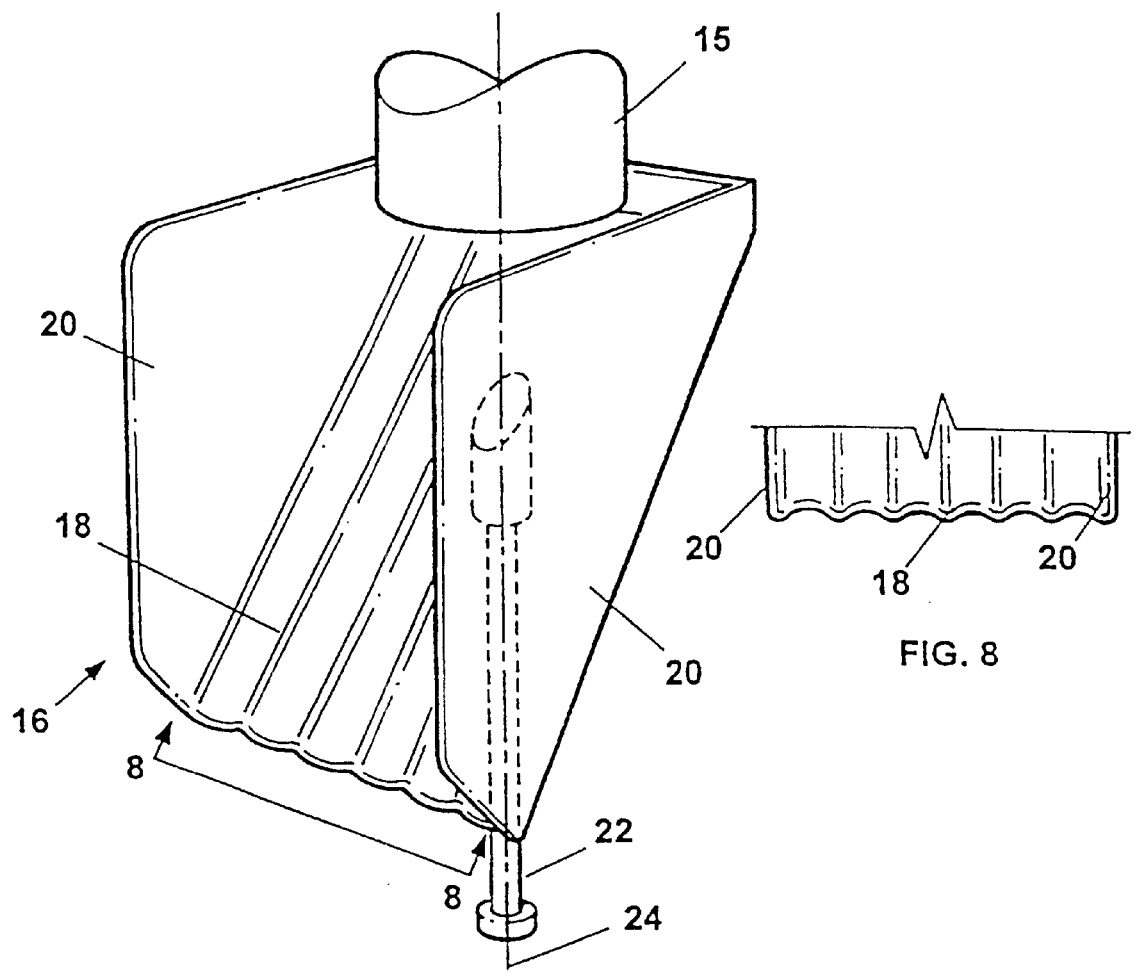
FIG. 7 is a perspective view of a material guide chute.
FIG. 8 is a partial end view of the chute of FIG. 7 along line 8—8.

The apparatus 10 includes a movable material guide in the form of chute 16 which has a generally U-shaped cross section. The chute is best seen in FIGS. 7 and 8 and includes an inclined upwardly convex corrugated base 18 between two side wails 20. The corrugations and convexity of the base 18 facilitate spreading of the flowable material evenly across the walls of the base 18. The chute 16 is mounted at the top of a shaft 22 which is rotatable about a vertical axis 24.

Each of the containers 12 and 14 is releasably mounted to respective weighing and bagging devices 26 and 28 respectively. Above each of the weighing and bagging devices 26 and 28 there is a pair of respective fixed material guides 30 and 32. The guides 30 and 32 are attached to each other along a vertical edge 34 which is at the apex of two inner inclined side walls 36 and 38 respectively.

Figures 1, 2:
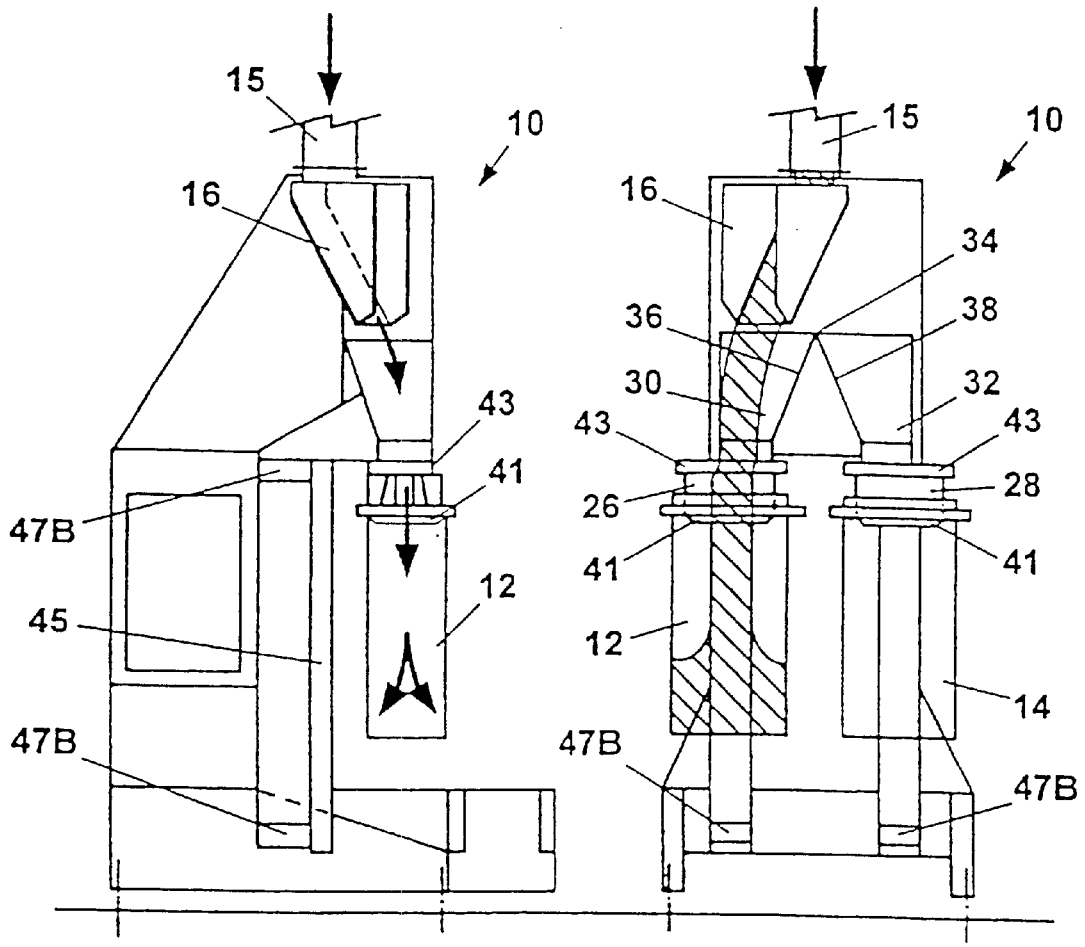
FIG. 1 is a side view of a filling apparatus according to a first embodiment of the invention with a movable material guide in the first position.
FIG. 2 is a front view of the apparatus shown in FIG. 1.
Figures 5, 6:
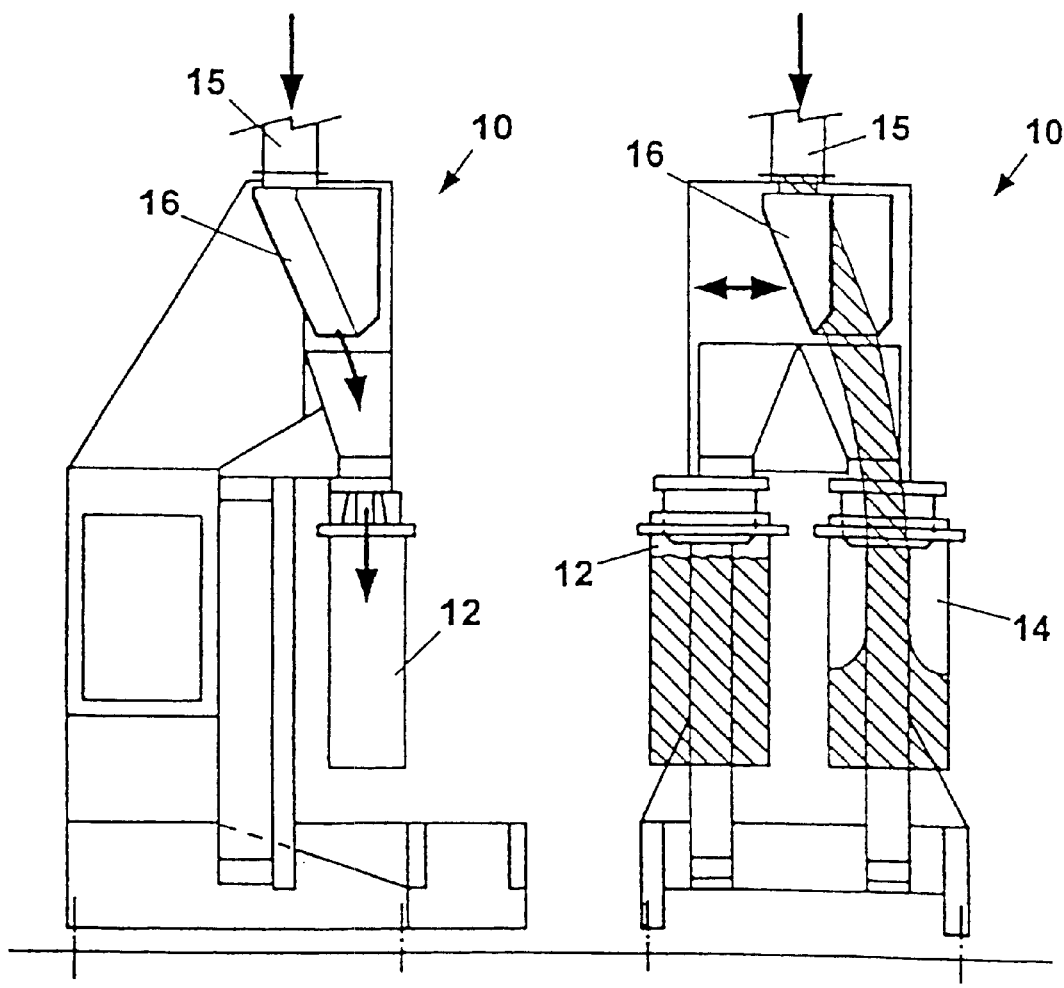
FIG. 5 is a side view of the apparatus shown in FIG. 1 with the material guide in the second position.
FIG. 6 is a front view of the apparatus shown in FIG. 5.

The chute 16 and the guides 30 and 32 are desirably manufactured from stainless steel for ease of cleaning and corrosion resistance. The chute 16 is adapted to be movable between a first position in which it directs all of the material input from the hopper through the first fixed guide 30 and into the first container 12, as shown in FIG. 2, and a second position in which it directs all of the material through the second fixed guide 32 into the second container 14, as shown in FIG. 6. At intermediate positions between the two positions, the flowable material input is incident on the edge 34 and is partially directed through both the fixed guides 30 and 32 and thus divided between the first and second containers 12 and 14 respectively, as shown in FIG. 4.

Figures 3, 4:
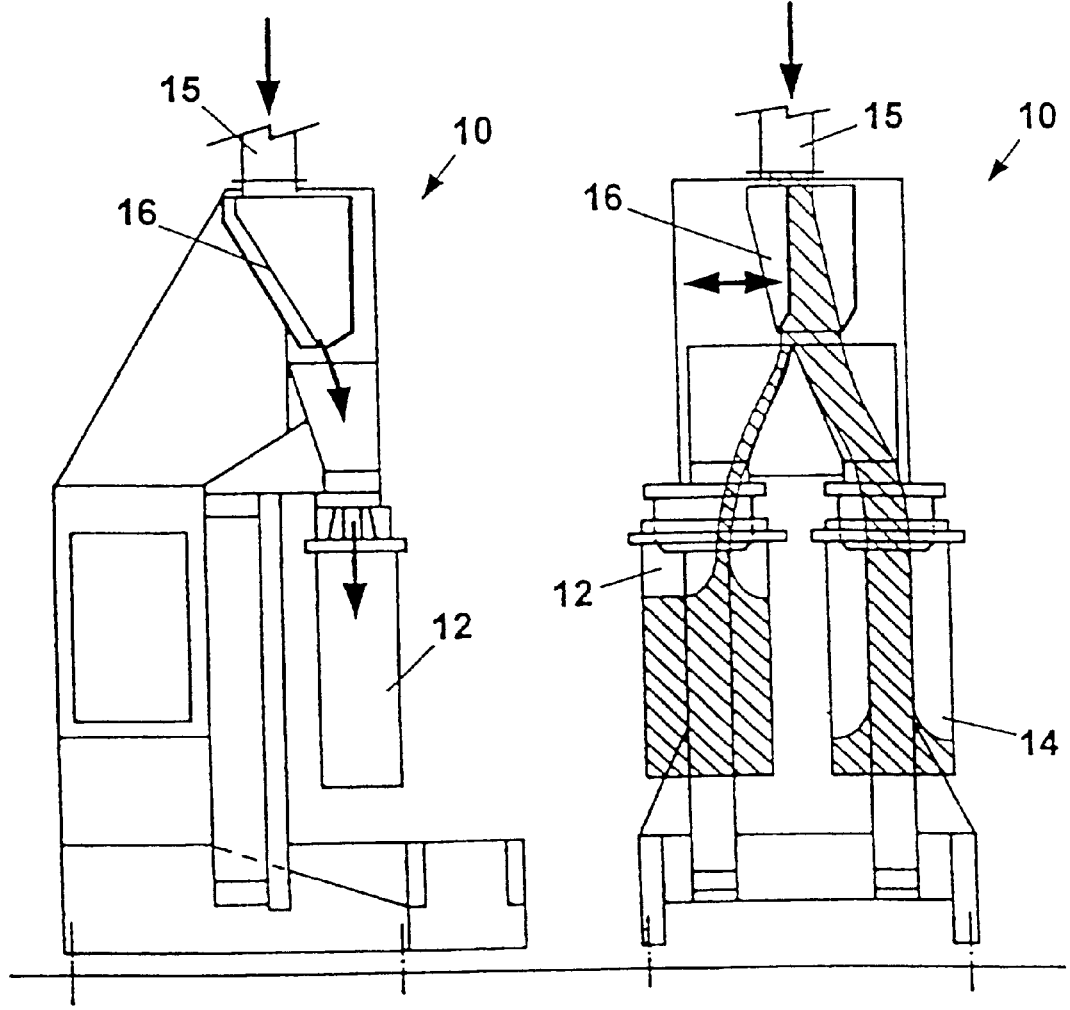
FIG. 3 is a side view of the apparatus shown in FIG. 1 with the material guide at an intermediate position between the first and second positions.
FIG. 4 is a front view of the apparatus shown in FIG. 3.

As FIG. 4 approximately indicates, the closer the chute 16 is to a first or second position, the greater proportion of the total available material flow is directed to the adjacent container 12 or 14. This allows a very slow flow rate of material to be directed into a container which is nearly full for accurate final filling and weighing off whilst the larger remaining flow of material can be simultaneously filling another container, thereby increasing accuracy and reducing overall filling times.

As an example, the apparatus 10 can be configured such that the chute 16 will initially direct all of the material flow to the first container 12 until the weighing and bagging device 26 indicates that the container 12 is approximately 85% full. At this point, the chute 16 pivoted towards the second position to an intermediate position above the edge 34 where 10% of the overall material flow continues to fill the first container 12 and the remaining 90% of the flow commences to fill the second container 14. When the first container 12 is 100% full, the chute 16 is moved to the second position and directs all of the material flow to the second container 14. As the second container reaches 85% full, the chute 16 is pivoted to another intermediate position directing 10% of the flow to the second container 14 and the remaining 90% to a new and empty first container 12. The chute 16 is continuously moved between first-intermediate-second positions until a predetermined number of containers has been filled or the material flow is exhausted.

Figure 9:
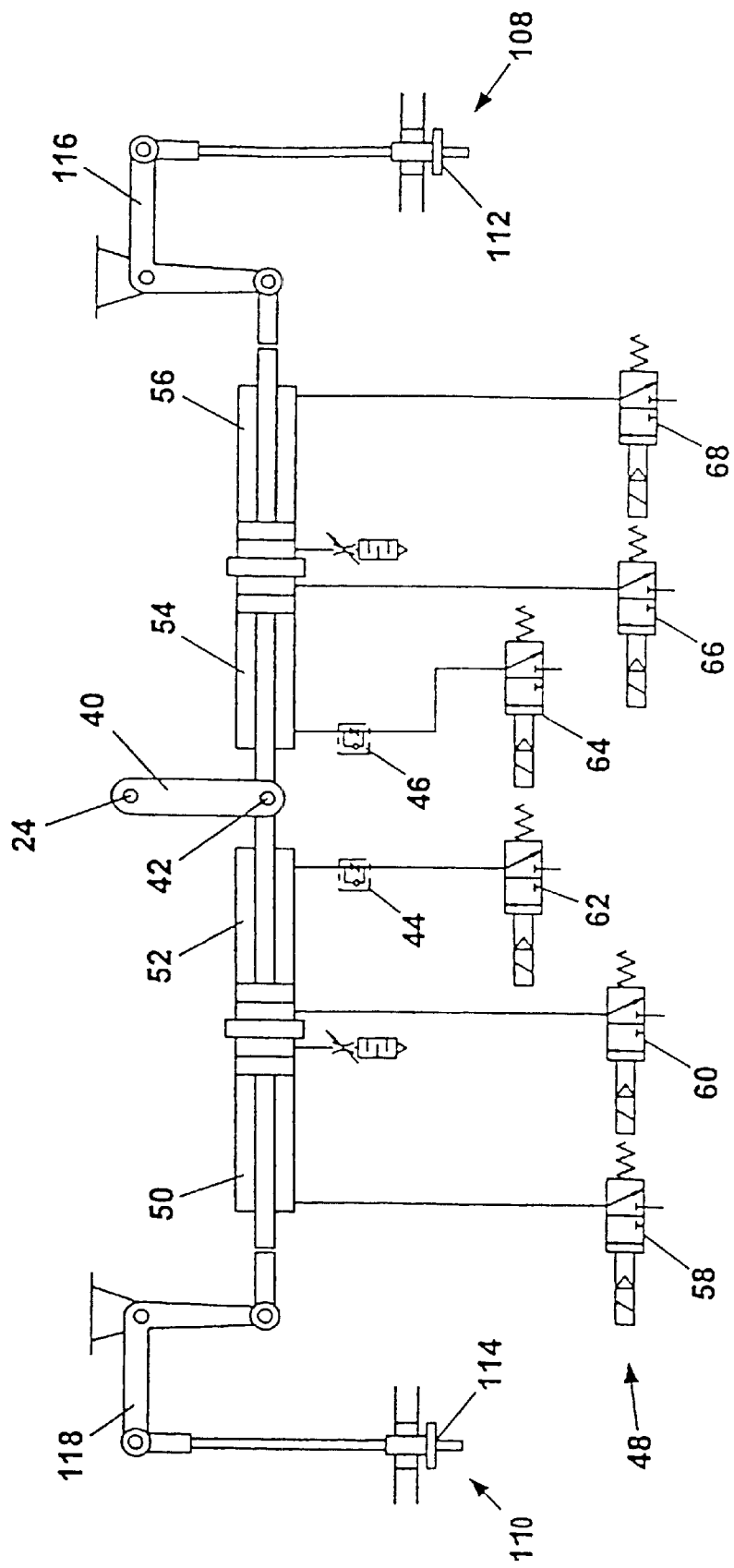
FIG. 9 is a schematic view of a pneumatic circuit used to control the position of the chute shown in FIGS. 1 to 7.

Another example will now be described with reference to pneumatic circuit 48 shown in FIG. 9 and the weighing and bagging devices 26, 28 shown in FIG. 10. FIG. 9 shows a pivotable link 40 which is attached to the shaft 22 such that movement of end 42 of link 40 causes the link 40 to pivot about axis 24 and thereby pivot the chute 16 between the first-intermediate-second positions. The weighing and bagging devices 26 and 28 each includes an air switch (not shown) to sense whether or not a container 12, 14 has been mounted in respect thereto. The circuit 48 also includes flow control valves 44 and 46, air cylinders 50, 52, 54 and 56 and control valves 58, 60, 62, 64, 66 and 68 which are all controlled by a Programmable Logic Controller (PLC) (not shown).

While air cylinders 50, 52, 54 and 56 will cause link 40 to pivot about axis 24 in order to pivot chute 16 to a first or second position or an intermediate position, adjustment mechanisms 108 and 110 (refer also FIG. 11) can provide fine adjustment of the flow from chute 16 into container 12 or 14. For example, rotation of wheel 112 or 114 will enable arm 116 or 118 respectively to make small adjustments in movement of end 42 of link 40, thus making fine adjustments in the position of chute 16. In this way, in some embodiments of the invention, it is possible to direct a very small proportion, say 10 grams, of the flow from chute 16 into container 12 and the rest of the flow into container 14.

Figure 10:
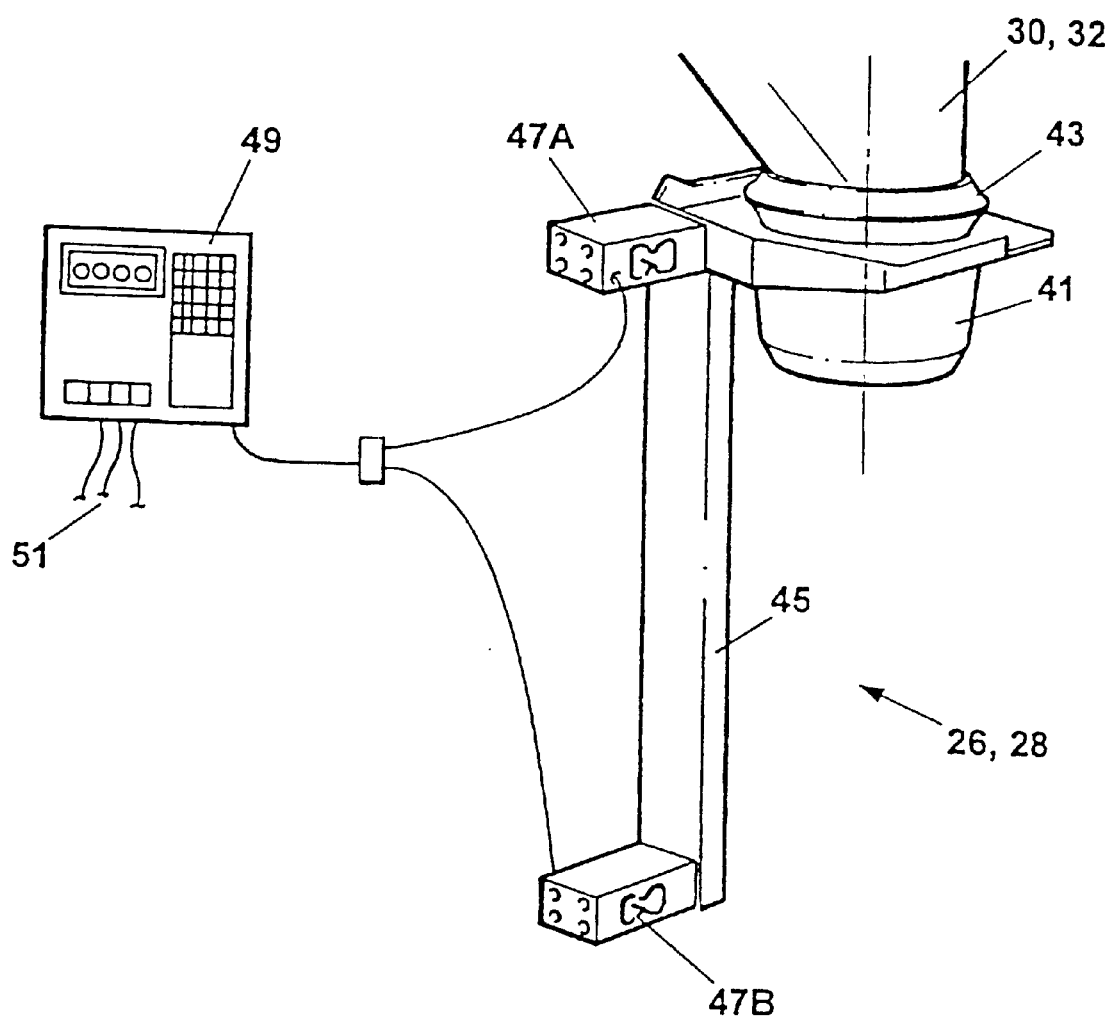
FIG. 10 is a perspective view of the load cell arrangement of the apparatus shown in FIG. 1.

FIG. 10 shows one of the weighing and bagging devices 26, 28, each of which includes a filling head 41 to which one of the container 12, 14 respectively, such as a bag, may be clamped. A flexible shroud 43 ensures material leaving the fixed guides 30, 32 does not spill whilst entering the filling head 41. Each of the filling heads 41 extends horizontally at right angles from a beam 45 which is mounted to the chassis of the apparatus 10 by two load cells 47A, 47B. The signals generated by each pair of the load cells 47A, 47B are calibrated to indicate the weight in each of the container 12, 14 in one of the respective pair of displays 49.

The circuit 48 receives control signals from the PLC in response to signals issued by the displays 49 through lines 51 indicating their respective container are, for example, 70%, 85%, or 100% of the total predetermined desired "full" container weight (known as set points one, two and three respectively). The displays 49 can be manually reset to provide other weight set-points.

Figure 11:
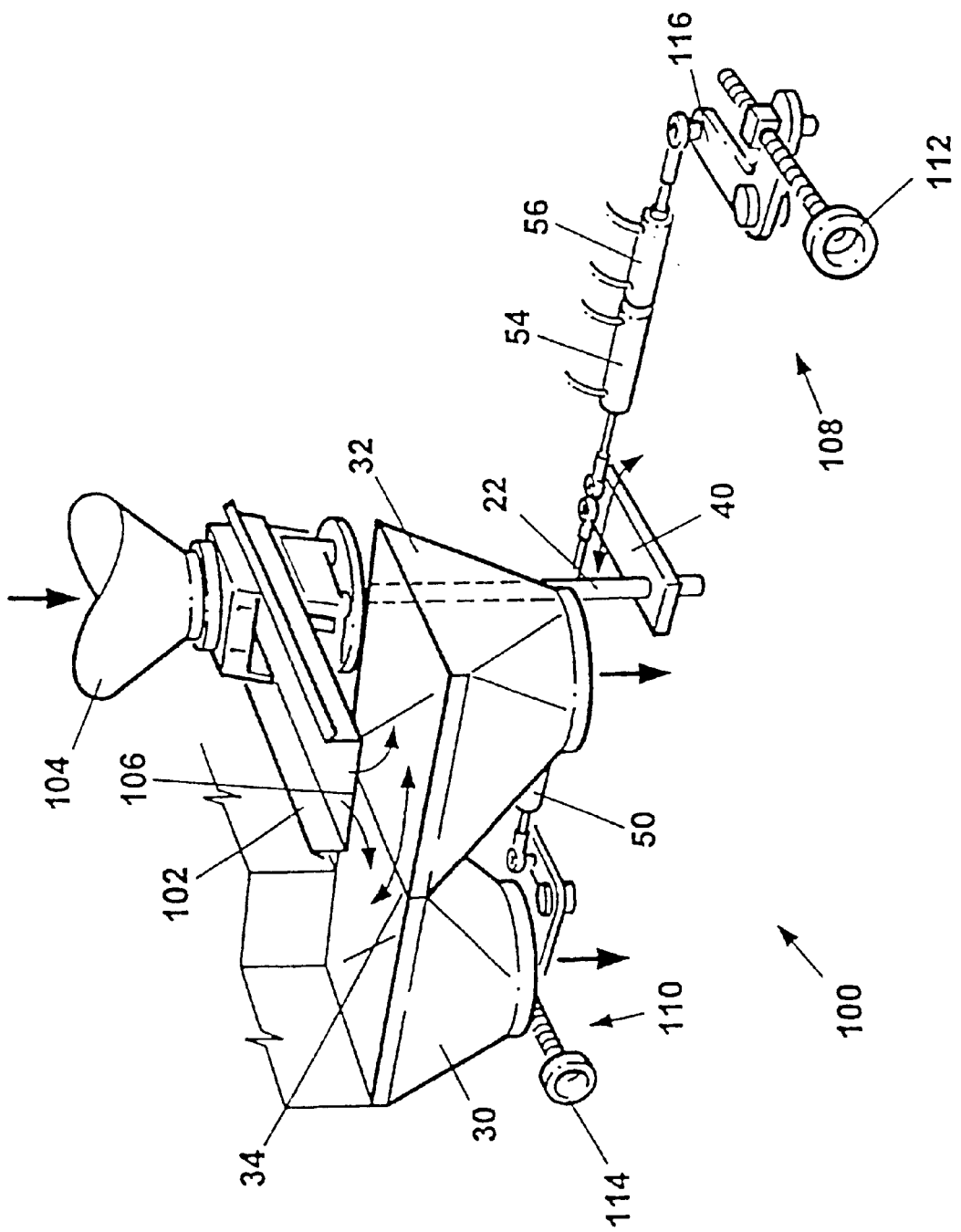
FIG. 11 is a perspective view of a filling apparatus according to a second embodiment of the invention.

As seen in FIGS. 10 and 11, when the apparatus 10 is activated, power is supplied to the weighing units 26 and 28 and the cylinders, 50 end 52 are retracted. The PLC then checks the state of the associated air valve to sense if a container 12 is clamped to the weighing device 26. If the container 12 is sensed to be present, the PLC energises the mechanism supplying the outlet 15 with flowable material, for example, an auger driven by a variable speed electric motor, and drives the motor at a speed inducing material flow at its highest possible rate. The chute 16 is in the first end position of FIG. 2 and directs all of the material flow into the first container 12. If the container 12 is not sensed to be present, the motor is not energised.

At set point one, the PLC checks to see if the other air valve is indicating whether the second container 14 is present at the second weighing and bagging device 28. If the container 14 is not present, the material flow is stopped. If the container 14 is sensed to be attached to the second weighing and bagging device 28, then the first set point is ignored, and flow continues into the first container 12.

At set point two, the PLC slows the motor to a speed inducing medium material flow and the cylinder 52 is extended to pivot the chute 16 to an intermediate position above the edge 34 so as to direct 10% of the material flow into the first container 12 and the remaining 90% of the material flow into the second container 14. At set point three, cylinders 54 and 56 are retracted so that the chute 16 is pivoted to the second end position directing all of the material flow into the second container 14. After a predetermined elapsed time to allow for the fall of inflight material, the PLC releases the container 12 from the (left hand side) filling head 41 so another empty container 12 can be attached for filling. The above process is then repeated in relation to the second container 14 and so on.

The flow control valves 44 and 46 connected to the cylinders 52 and 54 respectively ensure the chute 16 pivots relatively smoothly and slowly from an end to an intermediate position. The cylinders 50 and 56 do not use such a valve so they pivot the chute from an intermediate position to an end position as quickly as possible.

As an example in relation to filling a 20 kilogram bag, the first set point may be set at approximately 16 kilograms, the second set point approximately 19 kilograms and the third set point 19.95 kilograms (to allow for 0.05 kg of inflight material).

The apparatus 100 in FIG. 11 includes a vibrating tray 102 gravity fed directly from a hopper 104 to supply flowable material to the first and second fixed guides 30 and 32. The position of the outlet edge 106 of the tray 102 over the edge 34 of the guides determines the division of the material flow. Adjustment mechanisms 108 and 110 allows the tray position in each of the two intermediate positions to be varied to a fine degree, as discussed above.

In the example described above, there were three set points. As an example of a further variation, the first set point may be eliminated. As a safety precaution, at the set point indicating that a container is 85% full, the PLC can be programmed to check whether the other container is in place before pivoting chute 16 to an intermediate position as described above.

FIG. 12a shows the tray 102 in the first position directing all the material flow to the first container. FIG. 12b shows the tray 102 in the first intermediate position directing the majority of the flow to the second container. FIG. 12c shows the tray 102 pivoting to the second position. FIG. 12d shows the tray 102 directing all the flow to the second container. FIG. 12e shows the tray 102 in the second intermediate position directing the majority of the flow to the first container. FIG. 12f shows the tray 102 back in the first position.

FIG. 13 shows a further embodiment of a filling apparatus 120 having a substantially vertical nozzle 122 connected to a hopper 124 by a flexible tube 126. A gate valve 128 controls flow from the hopper 124 to the tube 126. The cylinders 50, 52, 54 and 56 are connected to the nozzle 122 by yoke 130 and pivot the nozzle 122 in a substantially vertical plane to adjust its position relative to the edge 34 between the first and second guides 30 and 32 respectively.

FIGS. 14 and 15 show yet a further embodiment of a filling apparatus 150 having a substantially horizontal nozzle 152 fed by an auger 154. The auger 154 is pivoted in a substantially horizontal plane to vary its position relative to the edge 34 of the guides 30 and 32.

Referring to FIGS. 16 to 19, there is shown an embodiment of an apparatus 101 for filling a plurality of containers including a first container 102, a second container 103, a third container at 104 and a fourth container at 105, with flowable material. The containers are positioned at filling stations 120, which are in a line. The flowable material 106 leaves the material feed 107 from, for example, an overhead hopper (not shown). The containers, once filled, may be replaced with empty containers for filling.

Each of the containers 102 and 103 is releasably mounted to respective weighing and bagging devices 108. Above each of the weighing and bagging devices 108 there is a material guide 109 having inclined walls 110 and 111. An edge 112 forms the apex of two inner inclined walls 110 and 111. The material feed 107 and the material guide 109 are desirably manufactured from stainless steel for ease of cleaning and corrosion resistance.

Figure 17:
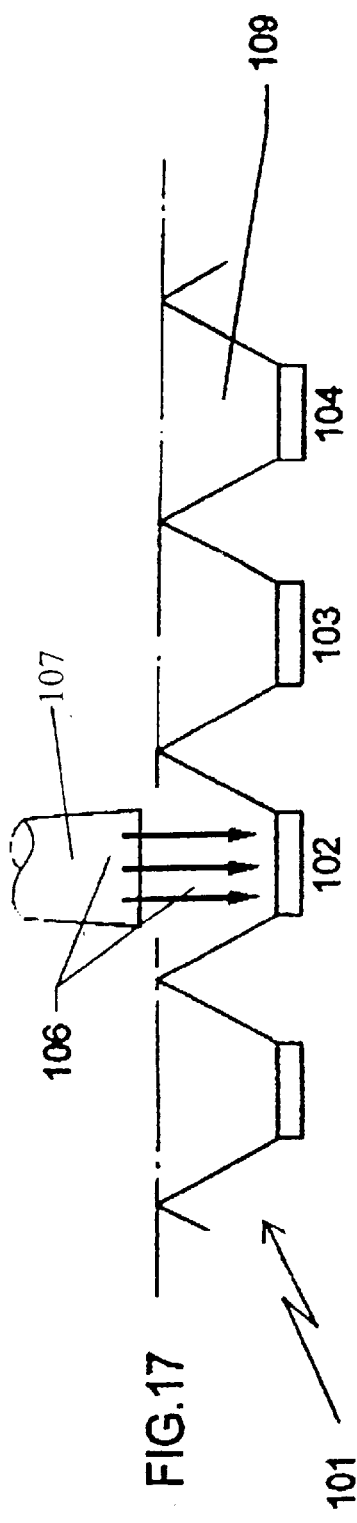
FIG. 17 is a schematic front view of the apparatus of FIG. 16 with the material guide in the first position.
Figure 18:
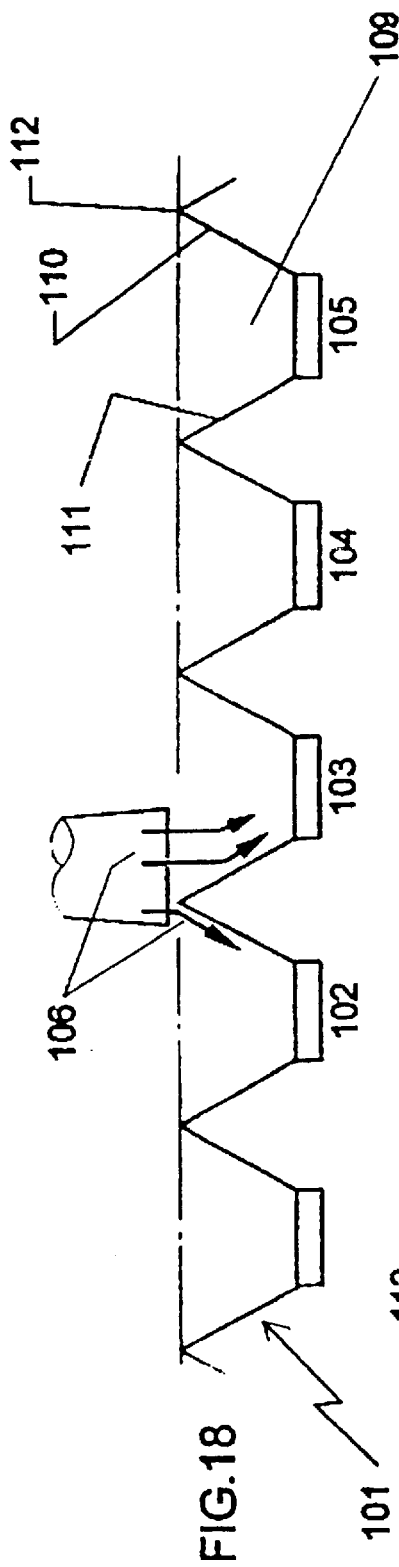
FIG. 18 is a schematic front view of the apparatus of FIG. 16 with the material guide in the intermediate position.
Figure 19:
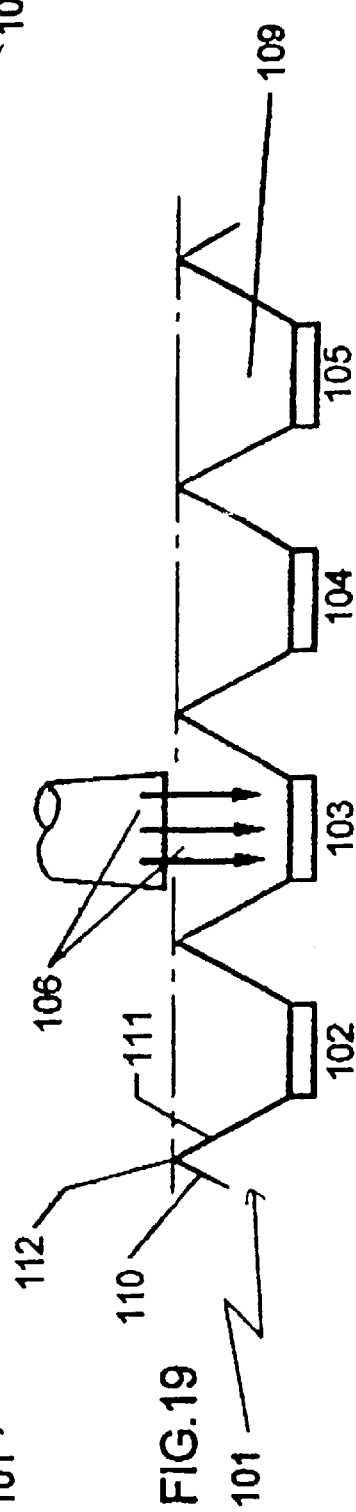
FIG. 19 is a front view of the apparatus of FIG. 16 with the material guide in the second position.

The material guide 109 is adapted to move along the line of filling stations, from container 102 to container 105, so that each container is filled sequentially. First, all of the material input from the hopper is directed into the first container 102, as shown in FIG. 17. At the intermediate positions, the flowable material 106 is incident on the edge 112 and thus divided between the first and second containers 102 and 103 respectively, as shown in FIGS. 16 and 18, with about 10% of the flow directed into container 102 and the balance directed into container 103. Material feed 107 remains stationary and filling stations (with their associated containers) are conveyed to the left as shown in FIGS. 17 to 19.

As edge 112 passes under material feed 107, the greater proportion of the total available material flow is directed to one of the adjacent containers and a lesser proportion of the total available material flows to the other adjacent container. This allows a very slow flow rate of material to be directed into a container which is nearly full for accurate final filling and weighing off whilst the larger remaining flow of material can be simultaneously filling another container, thereby increasing accuracy and reducing overall filling times.

As an example, the apparatus 101 can be configured such that the material guide 109 will initially direct all of the material flow to the first container 102 until the weighing and bagging device 108 indicates that the container 102 is approximately 85% full. At this point, the material feed 107 is in a position above the edge 112 where 10% of the overall material flow 106 continues to fill the first container 102 and the remaining 90% of the flow commences to fill the second container 103. When the first container 102 is 100% full, the filling stations have moved to the position where material feed 107 directs all of the material flow 106 to the second container 103. As the second container 103 reaches 85% full, 10% of the flow is directed to the second container 103 and the remaining 90% to the empty third container 104. This process is repeated until the third container 104 is 85% full. The remaining portion of the third container 104 is filled with 10% of the flow and filling of the fourth container 105 with 85% of the flow commences. The process is continued until a predetermined number of containers has been filled or the material flow is exhausted. Filled containers can be replaced with empty ones, and the direction of movement of the filling stations reversed.

Figure 20:
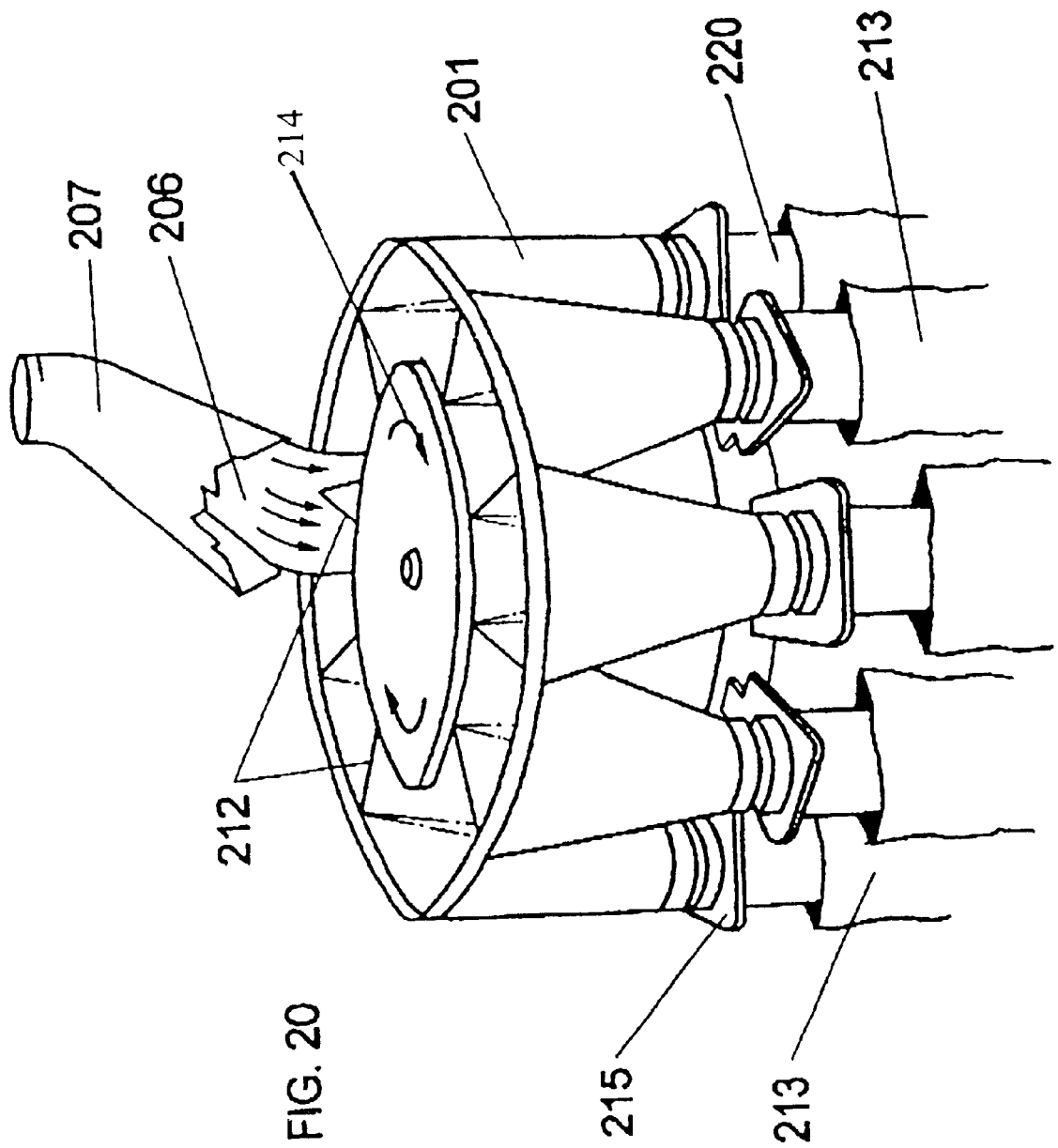
FIG. 20 is a perspective view of a sixth embodiment of the invention, the material guide being fixed and the filling stations being in a loop.

FIG. 20 shows another preferred embodiment. The apparatus 201 is arranged in a generally wheel formation such that when flowable material 206 flows from material feed 207 (which is shown as a chute as an example only) the filling stations 220 rotate relative to the material feed 207 in a clockwise direction as shown by arrow 214. As filling stations 220 move relative to material feed 207, flowable material 206 flows over edge 212. In doing so, flowable material 206 flows into a first container (not shown), and a second container (not shown). As the first container becomes completely filled, the second container and a third container (not shown) start to have material flow into them. The first container may be removed (the containers being removably attached to weighing and bagging device 208) and replaced with an empty container so that, when the wheel has rotated through 360 degrees the empty container will start to be filled. Empty containers 213 are shown as representative of the first, second and third containers concealed behind the wheel mechanism.

The direction of motion shown by arrow 214 may easily be reversed. The weighing and bagging devices 208 are attached to the wheel mechanism by a support strut 215. In this way of replacing the containers as they become filled, a continuous process of container filling occurs until either the flow of material is exhausted or sufficient numbers of containers have been filled.

INDUSTRIAL APPLICABILITY

A significant advantage of the filling apparatus is that the material flow need not be stopped. Once a first container is filled to a set point, a second container can be begun to be filled while the final portion of material fills the first container. If the filling stations are arranged in a loop with removably attached weighing and bagging apparatus, the containers can be accurately filled until the flow of material is stopped or the flow of material is exhausted by replacing the containers as they become filled.

Another advantage is the effect on filling and weighing accuracy. Inaccuracies due to any change of flow rate, through surging or pulsing of the material flow, are greatly reduced because, during the final weighing off, only 10% of the actual maximum flow of the material need be involved.

A related advantage is that the overall filling rate is no longer limited to a rate giving acceptable weighing off accuracy. In the examples given, the filling flow rate for most of the container may be nine times the weighing off flow rate. Further, the reduced rate of feed from the chute or the like in the intermediate position can be easily adjusted to give a desired degree of accuracy in relation to the type of product being weighed and filled.

Also, the load cells of the weighing and bagging devices (if used) can be linked to visual displays so that the actual weight of the containers may be continually displayed to operators and through appropriate software can be linked to printers, data recorders or the like.

Another advantage, especially in relation to the food industry, is that the internal components of the apparatus are simple and easy to clean and maintain.

Although the invention has been described with reference to certain preferred embodiments, it will be appreciated by those skilled in the are that the invention is not limited thereto.

What is claimed is:

1. An apparatus for filling a plurality of containers with flowable material, the apparatus including:
   a plurality of container filling stations arranged in a sequence;
   a fixed flow divider, located between one filling station and the next filling station in the sequence; and a material guide for flow of flowable material, wherein the apparatus includes means to move the material guide relative to the filling stations or vice versa so that the apparatus is capable of adopting:
- a first rest position in which all the flow of flowable material is guided to one of the container filling stations;
- an intermediate rest position in which the flow of flowable material is divided between the one container filling station and the next container filling station in the sequence; and
- a second rest position in which the flow of flowable material is guided to the next container filling station.

2. The apparatus of claim 1 wherein the filling stations move relative to the material guide.

3. The apparatus of claim 1, wherein the fixed flow divider includes an edge adapted to divide flow of the flowable material between the one container filling station and the next container filling station.

4. The apparatus of claim 1, which further includes one or more weighing devices to weigh the quantity of flowable material at each container filling station.

5. The apparatus of claim 1, wherein the apparatus includes a control system adapted to cause movement of the material guide or the filling stations.

6. The apparatus of claim 5, wherein there are more than two filling stations and they are arranged in a loop.

7. The apparatus of claim 6 further comprising a conveyor belt for moving the filling stations.

8. The apparatus of claim 5, wherein the filling stations are arranged in a straight line.

9. The apparatus of claim 5, wherein the control system includes fine adjustment means to accurately position the material guide or the filling stations.

10. The apparatus of claim 5, wherein the control system is adapted to cause movement of the material guide between the first, intermediate and second rest positions in response to the weight of flowable material in each of the first and second containers.

11. The apparatus of claim 1, wherein the material guide is a chute adapted to pivot about a substantially vertical axis between the first, intermediate and second rest positions.

12. The apparatus of claim 11, wherein the chute is generally v-shaped and has a base and side walls, the base being corrugated and inclined convexly upwards.

13. The apparatus of claim 1, wherein the material guide is chosen from the group comprising a vibrating tray, an auger fed nozzle adapted to pivot in a substantially horizontal plane and a gravity fed nozzle mounted beneath a flexible tube and adapted to pivot in a substantially vertical plane.

14. The apparatus of claim 1, which includes more than one material guide.

15. A method for filling a plurality of containers using the apparatus of claim 1, said method including the steps of:
(1) directing all of the flow of flowable material into a first container until it is filled to a first predetermined weight;
(2) directing a portion of the flow of flowable material into each of the first container and a second container adjacent the first container until the first container is substantially full;
(3) directing all of the flow of flowable material into the second container until it is filled to a second predetermined weight;
(4) directing a portion of the flow of flowable material into each of the second container and a third container adjacent the second container; and
(5) directing a portion of the flow of flowable material into each of the third and second containers until the second container is substantially full.

16. The method of claim 15, wherein steps (1) to (5) are repeated to continuously fill a plurality of containers until a predetermined number of containers is filled or the flow of flowable material is exhausted.

17. The method of claim 15, wherein the first predetermined weight is substantially equal to the second predetermined weight.

18. The method of claim 15, wherein in step (2) 10% of the flow of flowable material is directed into the first container and 90% of the flow of flowable material is directed into the second container.

19. The method of claim 15, wherein in step (5) 90% of the flow of flowable material is directed into the third container and 10% of the flow of flowable material is directed into the second container.

20. The method of claim 15, wherein there are two material guides, a first material guide for directing a larger proportion of the flowable material and a second material guide for directing the remainder of the flowable material.

21. The apparatus of claim 1 wherein the flowable material is grain, cereal or rice.

22. The apparatus of claim 1, wherein in the intermediate rest position 10% of the flow of flowable material is directed substantially to the one container filling station and 90% of the flow of flowable material is directed substantially to the next container filling station.

* * * * *